United States Patent
Oren et al.

(10) Patent No.: US 6,871,265 B1
(45) Date of Patent: Mar. 22, 2005

(54) METHOD AND APPARATUS FOR MAINTAINING NETFLOW STATISTICS USING AN ASSOCIATIVE MEMORY TO IDENTIFY AND MAINTAIN NETFLOWS

(75) Inventors: Eyal Oren, Raanana (IL); David E. Belz, Raanana (IL); Alon Ratinsky, Hadera (IL)

(73) Assignee: Cisco Technology, Inc., San Jose, CA (US)

( * ) Notice: Subject to any disclaimer, the term of this patent is extended or adjusted under 35 U.S.C. 154(b) by 177 days.

(21) Appl. No.: 10/079,229

(22) Filed: Feb. 20, 2002

(51) Int. Cl.[7] .............................................. G06F 12/00

(52) U.S. Cl. ....................... 711/128; 711/108; 711/133; 711/159

(58) Field of Search ................................ 711/128, 136, 711/108, 133, 159, 160; 709/223, 224

(56) References Cited

U.S. PATENT DOCUMENTS

| | | | | |
|---|---|---|---|---|
| 5,740,175 A | * | 4/1998 | Wakeman et al. | 370/422 |
| 5,764,634 A | * | 6/1998 | Christensen et al. | 370/389 |
| 5,842,040 A | | 11/1998 | Hughes et al. | |
| 5,872,783 A | * | 2/1999 | Chin | 370/395.32 |
| 5,920,886 A | | 7/1999 | Feldmeier | |
| 6,018,526 A | * | 1/2000 | Liu et al. | 370/401 |
| 6,026,467 A | * | 2/2000 | Petty | 711/108 |
| 6,091,725 A | | 7/2000 | Cheriton et al. | |
| 6,219,748 B1 | | 4/2001 | Srinivasan et al. | |
| 6,236,658 B1 | * | 5/2001 | Essbaum et al. | 370/401 |
| 6,240,485 B1 | | 5/2001 | Srinivasan et al. | |
| 6,243,667 B1 | | 6/2001 | Kerr et al. | |
| 6,430,190 B1 | * | 8/2002 | Essbaum et al. | 370/401 |
| 6,473,846 B1 | * | 10/2002 | Melchior | 711/170 |
| 6,615,260 B1 | * | 9/2003 | Honda et al. | 709/224 |
| 6,633,567 B1 | * | 10/2003 | Brown | 370/395.3 |
| 2003/0126358 A1 | * | 7/2003 | Litt et al. | 711/108 |

OTHER PUBLICATIONS

"Using MUSIC Devices and RCPs for IP Flow Recognition," Application Note AN–N27, Rev. 0, Music Semiconductors, Milpitas, CA, Oct. 21, 1998, 20 pages.

"Wide Ternary Searches Using Music CAMs and RCPs," Application Note AN–N31, Rev. 0, Music Semiconductors, Milpitas, CA, Apr. 13, 1999, 8 pages.

Steve Stas, "Enhancing LAN Bridge Designs with Associated Data," Application Note AN–N1, Rev. 1.5, Music Semiconductors, Milpitas, CA, Apr. 15, 1997, 8 pages.

"Aging a Station List with a Time Stamp," Application Brief AB–N2, Rev. 1.1a Draft, Music Semiconductors, Milpitas, CA, Sep. 30, 1998, 4 pages.

"Fast IPv4 and IPv4 CIDR Address Translation and Filtering Using the MUAC Routing CoProcessor (RCP)," Application Note AN–N25, Rev. 0a, Music Semiconductors, Milpitas, CA, Oct. 1, 1998, 16 pages.

Shah et al., *Maintaining Statistics Counters in Router Line Cards,* IEEE Micro, vol. 22, Issue 1, Jan.–Feb. 2002, pp. 76–81.

* cited by examiner

*Primary Examiner*—Matthew Anderson
*Assistant Examiner*—Shane Thomas
(74) *Attorney, Agent, or Firm*—The Law Office of Kirk D. Williams (57) ABSTRACT

Methods and apparatus are disclosed for maintaining netflow statistics using an associative memory to identify and maintain netflows. A lookup operation is performed on a set of associative memory entries to produce an associative memory result directly or after a subsequent memory read operation. In response to the associative memory result corresponding to a not found condition, an entry is added to the set of associative memory entries. Otherwise, a statistics entry in the set of statistics is updated based on the associative memory result. In one implementation, the associative memory is programmed with a set of permanent netflow entries and a set of dynamic or nonpermanent netflow entries, which are maintained in the form of a queue or ring buffer. In one embodiment, when the number of dynamic entries exceeds a threshold value, one or more of the dynamic entries and their corresponding statistics values are flushed.

24 Claims, 5 Drawing Sheets

METHOD AND APPARATUS FOR MAINTAINING NETFLOW STATISTICS USING AN ASSOCIATIVE MEMORY TO IDENTIFY AND MAINTAIN NETFLOWS

FIELD OF THE INVENTION

This invention especially relates to computer and communications systems; and more particularly, the invention relates to maintaining netflow statistics using an associative memory, such as, but not limited to a content-addressable memory, to identify and maintain netflows.

BACKGROUND OF THE INVENTION

The communications industry is rapidly changing to adjust to emerging technologies and ever increasing customer demand. This customer demand for new applications and increased performance of existing applications is driving communications network and system providers to employ networks and systems having greater speed and capacity (e.g., greater bandwidth). In trying to achieve these goals, a common approach taken by many communications providers is to use packet switching technology. Increasingly, public and private communications networks are being built and expanded using various packet technologies, such as Internet Protocol (IP).

A network device, such as a switch or router, typically receives, processes, and forwards or discards a packet based on one or more criteria, including the type of protocol used by the packet, addresses of the packet (e.g., source, destination, group), and type or quality of service requested. Additionally, one or more security operations are typically performed on each packet. But before these operations can be performed, a packet classification operation must typically be performed on the packet.

Packet classification as required for, inter alia, access control lists (ACLs) and forwarding decisions, is a demanding part of switch and router design. The packet classification of a received packet is increasingly becoming more difficult due to ever increasing packet rates and number of packet classifications. For example, ACLs require matching packets on a subset of fields of the packet flow label, with the semantics of a sequential search through the ACL rules. EP forwarding requires a longest prefix match.

Known approaches of packet classification include using custom application-specific integrated circuits (ASICs), custom circuitry, software or firmware controlled processors, binary and ternary content-addressable memories (CAMs). The use of programmable software or firmware have advantages as they provide some level of flexibility, which becomes especially important as new protocols and services are added to existing network. Customer typically desire to use their existing hardware (e.g., routers, switches etc.) to support these new protocols and services. However, known software and firmware implementations are relatively slow, and typically place a performance bound which may be incompatible with new requirements. Various applications that use packet classification, such as Security Access Control, Quality of Service etc., typically need to perform many matches on source and destination port numbers, protocol and/or other header fields, etc. in order to identify a corresponding netflow.

A known approach of identifying traffic flows for the purpose of prioritizing packets uses CAMs to identify and "remember" traffic flows allowing a network switch or router to identify packets belonging to that flow, at wire speed, without processor intervention. In one approach, learning new flows is automatic. Once a flow is identified, the system software assigns the proper priority to the newly identified flow. In each of the cases where learning is necessary (i.e., adding a new connection), the next free address of the device is read out so the system software can keep track of where the new additions are being placed. This way, the system software can efficiently remove these entries when they are no longer active. If aging is not used, the system software would need to keep track of the locations of every entry, and when a session ends, remove the corresponding entries. This is not a real-time issue, so software can provide adequate performance. Additionally, it is possible, even desirable to store timestamp information in the device to facilitate aging and purging of inactive flow identifiers.

For a purpose and context different from prioritizing packets, it is desirable to collect statistics about traffic flows (also referred to as "netflows"). These statistics can provide the metering base for real-time and post-processing applications including network traffic accounting, usage-based network billing, network planning, network monitoring, outbound marketing, and data mining capabilities for both service provider and enterprise customers.

However, known implementations for collecting netflow statistics use a CPU to examine each packet and a hashing function typically accessing a large data structure to identify a netflow and to maintain corresponding statistics. Such an implementation is CPU intensive, and may not be able to operate at the higher packet rates of certain systems. Needed are new methods and apparatus for collecting statistics on netflows.

SUMMARY OF THE INVENTION

Methods and apparatus are disclosed for maintaining netflow statistics using an associative memory, such as, but not limited to a content-addressable memory, to identify and maintain netflows. In one embodiment, a lookup operation in an associative memory on a set of associative memory entries based on an item to generate an associative memory result directly or after a subsequent memory read operation. This associative memory result is evaluated. In response to the associative memory result corresponding to a not found condition, an entry is added to the set of associative memory entries. In response to the associative memory result corresponding to a found condition, a statistics entry in the set of statistics is updated based on the associative memory result.

BRIEF DESCRIPTION OF THE DRAWINGS

The appended claims set forth the features of the invention with particularity. The invention, together with its advantages, may be best understood from the following detailed description taken in conjunction with the accompanying drawings of which:

DETAILED DESCRIPTION

Systems and methods are disclosed for maintaining netflow statistics using an associative memory, such as, but not limited to a content-addressable memory (CAM). Embodiments described herein include various elements and limitations, with no one element or limitation contemplated as being a critical element or limitation. Each of the claims individually recites an aspect of the invention in its entirety. Moreover, some embodiments described may include, but are not limited to, inter alia, systems, networks, integrated circuit chips, embedded processors, ASICs, methods, and computer-readable medium containing instructions. The embodiments described hereinafter embody various aspects and configurations within the scope and spirit of the invention, with the figures illustrating exemplary and non-limiting configurations.

As used herein, the term "packet" refers to packets of all types or any other units of information or data, including, but not limited to, fixed length cells and variable length packets, each of which may or may not be divisible into smaller packets or cells. The term "packet" as used herein also refers to both the packet itself or a packet indication, such as, but not limited to all or part of a packet or packet header, a data structure value, pointer or index, or any other part or identification of a packet. Moreover, these packets may contain one or more types of information, including, but not limited to, voice, data, video, and audio information. The term "item" is used herein to refer to a packet or any other unit or piece of information or data.

The term "system" is used generically herein to describe any number of components, elements, sub-systems, devices, packet switch elements, packet switches, routers, networks, computer and/or communication devices or mechanisms, or combinations of components thereof. The term "computer" is used generically herein to describe any number of computers, including, but not limited to personal computers, embedded processors and systems, control logic, ASICs, chips, workstations, mainframes, etc. The term "device" is used generically herein to describe any type of mechanism, including a computer or system or component thereof. The terms "task" and "process" are used generically herein to describe any type of running program, including, but not limited to a computer process, task, thread, executing application, operating system, user process, device driver, native code, machine or other language, etc., and can be interactive and/or non-interactive, executing locally and/or remotely, executing in foreground and/or background, executing in the user and/or operating system address spaces, a routine of a library and/or standalone application, and is not limited to any particular memory partitioning technique. The steps, connections, and processing of signals and information illustrated in the figures, including, but not limited to the block and flow diagrams, are typically performed in a different serial or parallel ordering and/or by different components and/or over different connections in various embodiments in keeping within the scope and spirit of the invention.

Moreover, the terms "network" and "communications mechanism" are used generically herein to describe one or more networks, communications mediums or communications systems, including, but not limited to the Internet, private or public telephone, cellular, wireless, satellite, cable, local area, metropolitan area and/or wide area networks, a cable, electrical connection, bus, etc., and internal communications mechanisms such as message passing, interprocess communications, shared memory, etc.

The term "storage mechanism" includes any type of memory, storage device or other mechanism for maintaining instructions or data in any format. "Computer-readable medium" is an extensible term including any memory, storage device, storage mechanism, and other storage and signaling mechanisms including interfaces and devices such as network interface cards and buffers therein, as well as any communications devices and signals received and transmitted, and other current and evolving technologies that a computerized system can interpret, receive, and/or transmit. The term "memory" includes any random access memory (RAM), read only memory (ROM), flash memory, integrated circuits, and/or other memory components or elements. The term "storage device" includes any solid state storage media, disk drives, diskettes, networked services, tape drives, and other storage devices. Memories and storage devices may store computer-executable instructions to be executed a processor and/or control logic, and data which is manipulated a processor and/or control logic. The term "data structure" is an extensible term referring to any data element, variable, data structure, data base, and/or one or more or an organizational schemes that can be applied to data to facilitate interpreting the data or performing operations on it, such as, but not limited to memory locations or devices, sets, queues, trees, heaps, lists, linked lists, arrays, tables, pointers, etc. A data structure is typically maintained in a storage mechanism. The term "associative memory" refers to all types of known or developed associative memories, including, but not limited to binary and ternary content-addressable memories, hash tables, TRIE and other data structures, etc.

The terms "first," "second," etc. are typically used herein to denote different units (e.g., a first element, a second element). The use of these terms herein does not necessarily connote an ordering such as one unit or event occurring or coming before the another, but rather provides a mechanism to distinguish between particular units. Moreover, the phrase "based on x" is used to indicate a minimum set of items x from which something is derived, wherein "x" is extensible and does not necessarily describe a complete list of items on which the operation is based. Additionally, the phrase "coupled to" is used to indicate some level of direct or indirect connection between two elements or devices, with the coupling device or devices modify or not modifying the coupled signal or communicated information. The term "subset" is used to indicate a group of all, less than all, or none of the elements of a set. Moreover, the term "or" is used herein to identify an alternative selection of one or more, including all, of the conjunctive items.

Methods and apparatus are disclosed for maintaining netflow statistics using an associative memory, such as, but not limited to a content-addressable memory, to identify and maintain netflows. In one embodiment, a lookup operation is performed in an associative memory on a set of associative memory entries based on an item to produce an associative memory result directly or after a subsequent memory read operation. This associative memory result is evaluated. In response to the associative memory result corresponding to a not found condition, an entry is added to the set of associative memory entries. In response to the associative memory result corresponding to a found condition, a statistics entry in the set of statistics is updated based on the associative memory result. In one embodiment, the associative memory is programmed with a set of permanent netflow entries and a set of dynamic or nonpermanent netflow entries. In one embodiment, the set of dynamic entries are maintained as a queue or ring buffer. In one embodiment, when the number of dynamic entries exceeds a threshold value, one or more of the dynamic entries and their corresponding statistics values are flushed to a netflow/statistics collector (e.g., a CPU or other hardware/software device or mechanism), which typically has a larger memory and collects all flushed entries from the associative memory and their corresponding statistics. In one embodiment, this flushing includes one or more of the oldest entries being removed from the dynamic set of entries and their corresponding statistics values extracted from the statistics mechanism for processing. In one embodiment, the oldest entry is located at the head of the queue or ring buffer. By dynamically changing the current set of statistics being collected by the statistics mechanism and the corresponding entries in an associative memory, the overall number of statistics collected can exceed the number of physical resources or entries available in the statistics mechanism and/or associative memory.

One embodiment includes a mechanism to automatically learn new flows, update their statistics, and export the data to a companion processor. One embodiment includes a ternary content-addressable memory (TCAM), which can be shared with other packet processing functions, and a programmable mechanism which creates a key from the packet header, information derived from the packet header (such as AS#), or other information (e.g., from an interface). This key is then used to perform a lookup operation in the TCAM. If there is a hit (e.g., a found condition), then byte, packet, and/or other counters, and possibly timestamp information are updated in a parallel SRAM for this entry. If there is a miss (e.g., a not found condition), then a new entry is added to the TCAM. If the number of free entries falls below a certain threshold, then an "old" entry is flushed. The TCAM is organized as a FIFO (e.g., ring buffer) of entries. Whenever an entry is flushed, or created, an information record is stored in an internal FIFO which is processed by the local CPU. The mechanism for reading this FIFO may or may not include a hardware DMA to move the data to the CPU's SDRAM, because in the most extreme case, the CPU cannot keep up with the rate of flow information being fed to it. In addition, in one embodiment, there is a background timer based task which periodically flushes out the TCAM entries so that flows that have stopped don't get missed by the CPU. Furthermore, this scheme will be repeated per packet for as many netflow tables are configured, each using its own key field.

Figure 1:
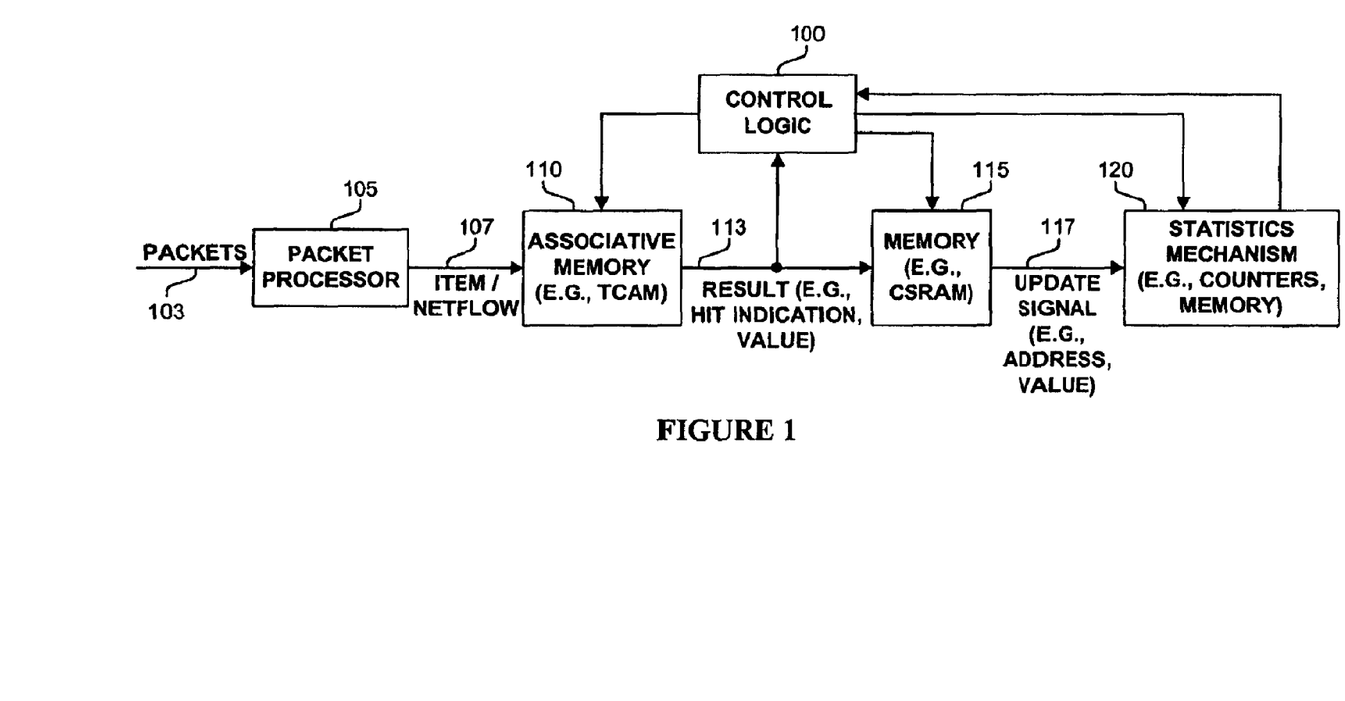
FIG. 1 is a block diagram of one embodiment maintaining netflow statistics using an associative memory.
Figure 3:
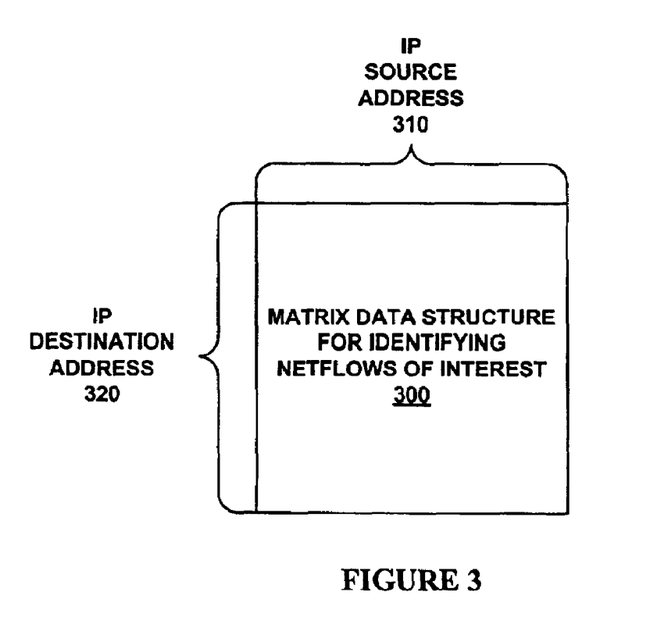
FIG. 3 is a block diagram of a data structure used in one embodiment for identifying netflows on which to maintain statistics.

FIG. 1 illustrates one embodiment of a system, which may be part of a router or other communications or computer system, for maintaining netflow statistics using an associative memory, such as, but not limited to a content-addressable memory, to identify and maintain netflows. In one embodiment, packets 103 are received by packet processor 105. In addition to other operations (e.g., packet routing, security, etc.), packet processor 105 typically generates one or more items, including, but not limited to one or more netflow identifiers (typically referred to herein as "netflows") based on one or more fields of one or more of the received packets 103 and possibly from information stored in data structures or acquired from other sources. Packet processor 105 generates zero or more items 107 (such as a netflow or other value) to be processed by associative memory 110. In one embodiment, a data structure 300 (FIG. 3) is used to identify netflows for IP source address 310, IP destination address 320 pairs, wherein a corresponding entry identifies (e.g., is set or not set to some value) whether to generate an item or netflow on which to maintain statistics.

Associative memory 110 performs a lookup operation on a receive item 107 to generate a result 113, which typically includes a hit indication (e.g., found or not found) and possibly an identification value of the successful match. Control logic 100 receives an indication of result 113, and if the item 107 was not found in the entries of associative memory 110, control logic 100 adds an entry corresponding to item 107 and initializes a corresponding location in memory 115 to identify a particular counter (e.g., a physical counter, memory location, other counting method or mechanism, etc.) within statistics mechanism 120, and possibly initializes this particular counter within counting mechanism 120 to zero, one, or some other number of counting units (e.g., packets, bytes, bits, any possible unit, etc) If, however, item 107 was matched in associative memory 110, then a read operation is performed on memory 115 based on result 113 to generate update signal 117 indicating the particular counter within statistics mechanism 120, and the particular counter being updated by some number of counting units by statistics mechanism 120.

Figure 4:
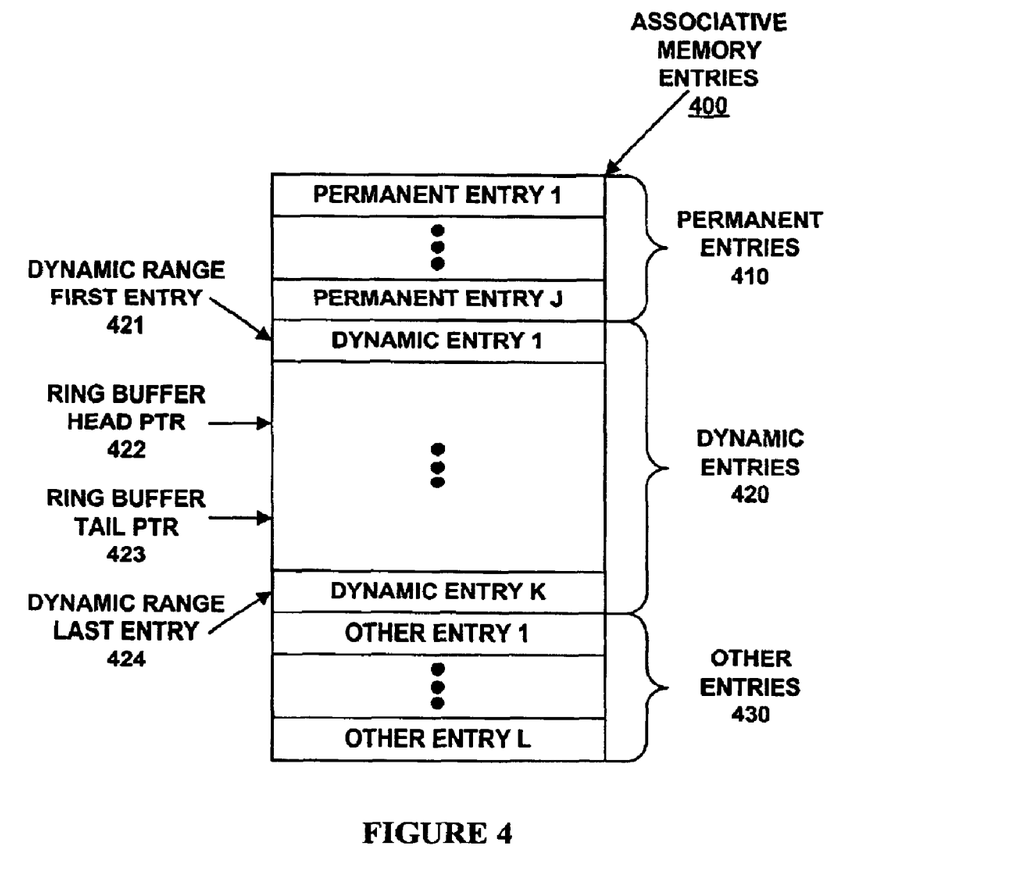
FIG. 4 is a block diagram of sets of associative memory entries used in one embodiment.

In one embodiment, dynamic entries 420 are aged and routinely purged, such as when the number of entries within dynamic entries 420 exceeds a predetermined or dynamic threshold number of entries. Purging typically includes removing one or more entries from dynamic entries 420 and retrieved corresponding statistics values from statistics mechanism 120 by control logic 100. In one embodiment control logic 100 purges entries from and/or adds entries to permanent entries 410. In one embodiment, dynamic entries 420 are maintained by control logic 100 as a queue and/or ring buffer of entries using one or more of the following values or pointers: dynamic range first entry 421, ring buffer head pointer 422, ring buffer tail pointer 423, dynamic range last entry 424. In one embodiment, the ring buffer head pointer 422 and ring buffer tail pointer 423 identify the youngest and oldest entries in dynamic entries 420.

Figure 2:
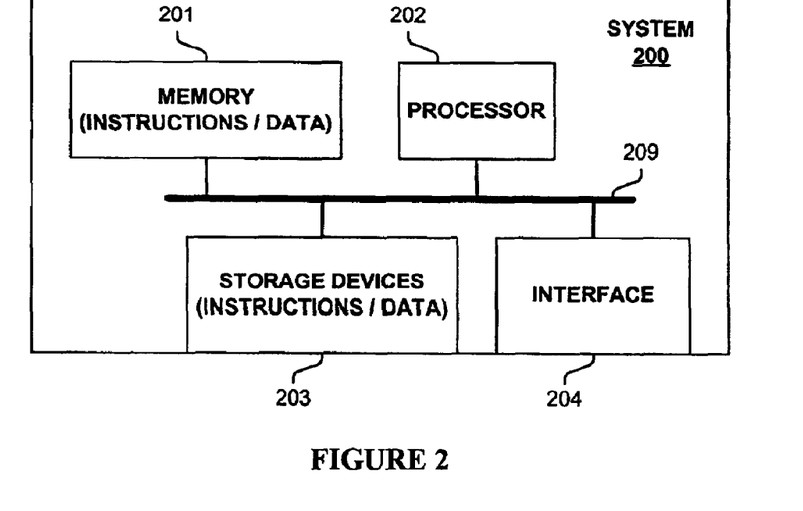
FIG. 2 is a block diagram of a system used in one embodiment in place of, or in addition to control logic.

In one embodiment, control logic 100 (FIG. 1) includes custom circuitry, such as, but not limited to discrete circuitry, ASICs, memory devices, etc. In one embodiment, control logic 100 includes system 200 (FIG. 2). In one embodiment, system 200 includes a processor 202, memory 201, storage devices 203, and interface 204 (for communicating with associative memory 110, memory 115 and statistics mechanism 120 of FIG. 1), which are coupled via one or more communications mechanisms 209 (shown as a bus for illustrative purposes). In one embodiment, system 200 performs a netflow/statistics collector function and collects flushed entries and their corresponding statistics.

Various embodiments of system 200 may include more or less elements. The operation of system 200 is typically controlled by processor 202 using memory 201 and storage devices 203 to perform one or more tasks or processes. Memory 201 is one type of computer-readable medium, and typically comprises random access memory (RAM), read only memory (ROM), flash memory, integrated circuits, and/or other memory components. Memory 201 typically stores computer-executable instructions to be executed by processor 202 and/or data which is manipulated by processor 202 for implementing functionality in accordance with an embodiment of the invention. Storage devices 203 are another type of computer-readable medium, and typically comprise solid state storage media, disk drives, diskettes, networked services, tape drives, and other storage devices. Storage devices 203 typically store computer-executable instructions to be executed by processor 202 and/or data which is manipulated by processor 202 for implementing functionality in accordance with an embodiment of the invention.

Figure 5:
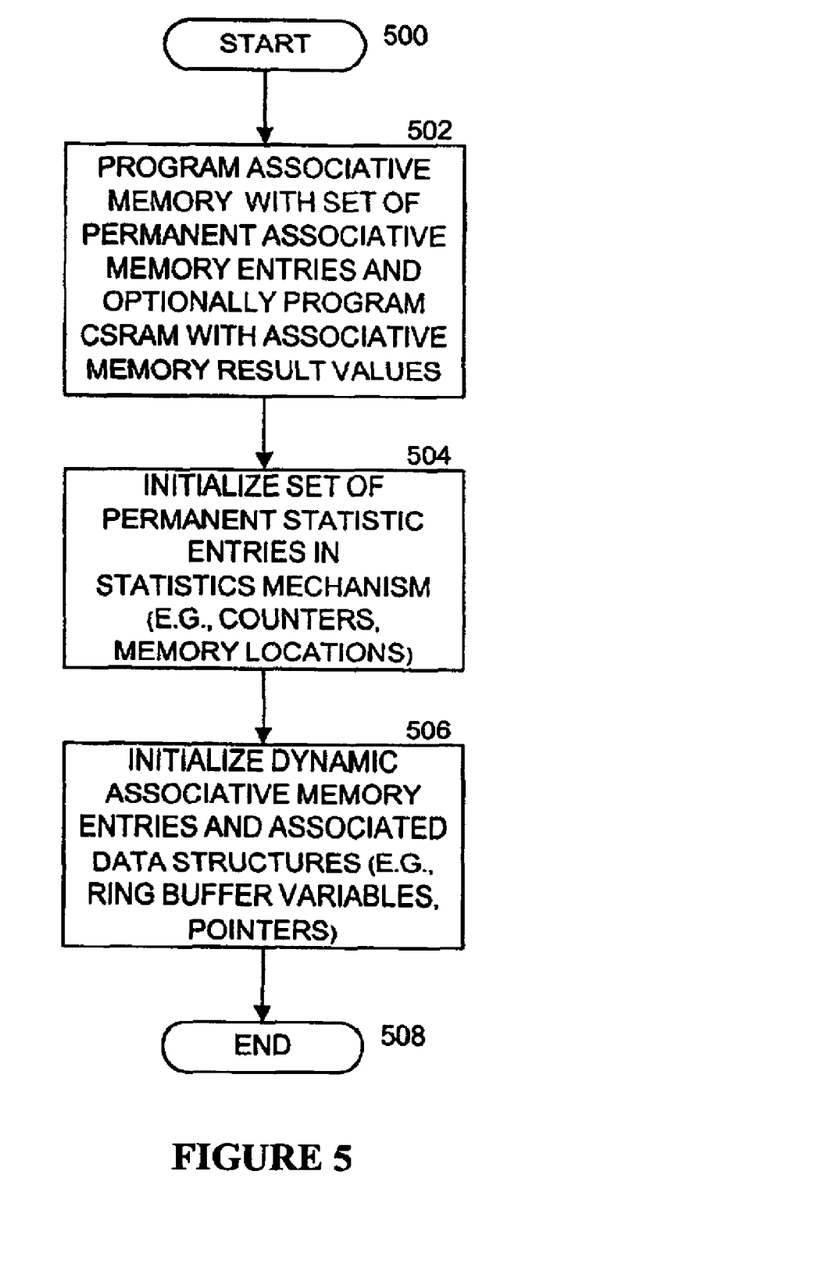
FIGS. 5 and 6 illustrate processes used in one embodiment for maintaining netflow statistics using an associative memory.

FIG. 5 illustrates a process used in one embodiment for programming a set of permanent entries in an associative memory and corresponding statistics. Processing begins with process block 500, and proceeds to process block 502, wherein the associative memory is programmed with a set of permanent associative memory entries. In one embodiment, the CSRAM or other adjunct memory is also programmed with an indicator of the corresponding statistics element of the statistics mechanism. Next, in process block 504, the entries of the corresponding set of permanent statistic entries in the statistic mechanism are initialized to some value, such as zero. Next, in process block 506, dynamic (e.g., nonpermanent) entries and associated data structures are initialized, typically to empty the set of dynamic entries. Processing is complete as indicated by process block 508.

Figure 6:
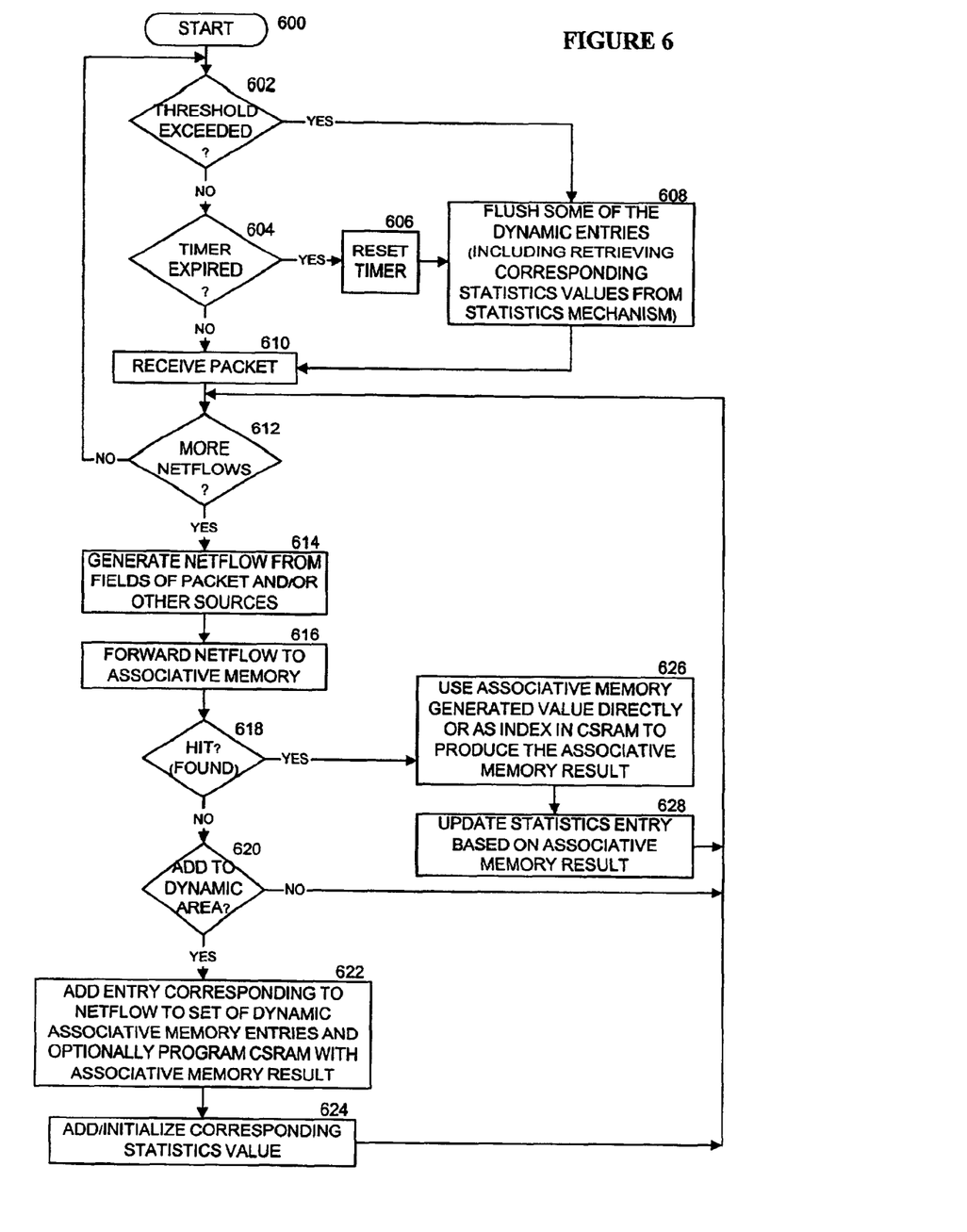

FIG. 6 illustrates a process used in one embodiment to dynamically add and collect statistics on netflows and to flush entries from a dynamic set of entries maintained by an associative memory. One embodiment uses multiple processes to implement the functionality described by the flow diagram illustrated in FIG. 6.

Processing begins with process block 600, and proceeds to process block 602. If the threshold number of entries in the dynamic set of entries is exceeded, then processing proceeds to process block 608. Otherwise, as determined in process block 604, if a timer has expired, then the timer is reset in process block 606, and processing also proceeds to process block 608. In process block 608, one or more of the entries are flushed from the dynamic set of entries which includes collecting corresponding statistics from the statistics mechanism. In one embodiment, flushing some of the dynamic entries includes retrieving their corresponding statistics values and removing their corresponding entries from a content-addressable memory (and possibly adjunct memory). In one embodiment, flushing some of the dynamic entries also includes only retrieving their corresponding statistics values to avoid of an overflow condition of a statistics element in response to, or based on a particular condition, such as but not limited to the expiration of a timer.

In process block 610, a packet is received. Next, as determined in process block 612, if there are no more netflows to generate for the received packet, then processing returns to process block 602. Otherwise, in process block 614, a netflow is generated from fields of the received packet and/or other sources.

In one embodiment, a lookup word either includes or has a corresponding indication of whether to perform the lookup in the (a) permanent entries, (b) dynamic entries, or (c) both the permanent and dynamic entries. In one embodiment, which set of entries on which to perform the lookup operation is implicit.

In process block 616, the netflow is forwarded to the associative memory. If, as determined in process block 618, the associative memory lookup operation did not result in a hit (e.g., the netflow is not in the associative memory), then processing proceeds to process block 620. If, as determined in process block 620, that an entry should be added to the set of dynamic entries (e.g., depending on the embodiment, when the lookup operation was performed on the dynamic entries, both the dynamic and permanent sets of entries, or just the permanent entries), then in process block 622, an entry corresponding to the netflow is added to the set of dynamic associative memory entries. In one embodiment, the CSRAM or other adjunct memory is also programmed with an indicator of the corresponding statistics element of the statistics mechanism. Next, in process block 624, the corresponding statistics entry of the statistic mechanism is added or initialized. Processing then returns to process block 612.

Otherwise, an associative memory hit was generated based on the netflow, and in process block 626, the associative memory result is produced directly from the value generated by the associative memory or retrieved from the CSRAM or other adjunct memory based on this value. In process block 628, the corresponding statistics entry (identified based on the associative memory result) is updated. Processing returns to process block 612.

In view of the many possible embodiments to which the principles of our invention may be applied, it will be appreciated that the embodiments and aspects thereof described herein with respect to the drawings/figures are only illustrative and should not be taken as limiting the scope of the invention. For example and as would be apparent to one skilled in the art, many of the process block operations can be re-ordered to be performed before, after, or substantially concurrent with other operations. Also, many different forms of data structures could be used in various embodiments. The invention as described herein contemplates all such embodiments as may come within the scope of the following claims and equivalents thereof.

What is claimed is:

1. A method comprising:
   performing a lookup operation in an associative memory on a set of associative memory entries based on an item to generate an associative memory result directly or after a subsequent memory read operation;
   evaluating the associative memory result;
   in response to the associative memory result corresponding to a not found condition, adding an entry to the set of associative memory entries;
   in response to the associative memory result corresponding to a found condition, updating a statistics entry in a set of statistics based on the associative memory result; and
   in response to determining a number of entries within the set of associative memory entries exceeds a threshold, identifying a position of an oldest entry in the set of associative memory entries and after said identifying the position, retrieving a first statistics value corresponding to the position from the set of statistics;
   wherein the set of associative memory entries is maintained as a queue.

2. The method of claim 1, wherein the item corresponds to a netflow, the netflow including a source address and a destination address, or the netflow including a source address, a destination address, and a port number.

3. The method of claim 1, further comprising adding or initializing an initial statistics value in the set of statistics in response to the associative memory result corresponding to the not found condition.

4. The method of claim 1, wherein the set of statistics is maintained in a second memory.

5. The method of claim 1, wherein the associative memory includes a binary or ternary content-addressable memory.

6. The method of claim 1, wherein said updating the statistics entry includes adding a byte count corresponding to the item to a current value of the statistics entry.

7. An apparatus comprising:
   means for performing a lookup operation in an associative memory on a set of associative memory entries based on an item to generate an associative memory result after a subsequent memory read operation;

means for evaluating the associative memory result;
means for adding an entry to the set of associative memory entries in response to the associative memory result corresponding to a not found condition;
means for updating a statistics entry in a set of statistics based on the associative memory result in response to the associative memory result corresponding to a found condition; and
means for maintaining the set of associative memory entries as a queue.

8. The apparatus of claim 7, further comprising means for removing entries from the set of associative memory entries and for forwarding their corresponding statistics values from the set of statistics to a collection mechanism in response to a number of entries within the set of associative memory entries exceeding a threshold.

9. A method comprising:
programming an associative memory with a set of permanent associative memory entries within a set of associative memory entries;
initialing or adding a set of permanent statistic entries within a set of statistic entries in a memory device;
performing a lookup operation in the associative memory on the set of associative memory entries based on an item to generate an associative memory result directly or after a subsequent memory read operation;
evaluating the associative memory result;
in response to the associative memory result corresponding to a not found condition:
  adding an entry to a set of nonpermanent associative memory entries within the set of associative memory entries; and
  initializing or adding a corresponding initial statistics value to a set of nonpermanent statistics within the set of statistic entries;
in response to the associative memory result corresponding to a found condition, updating a statistics entry in the set of statistics based on the associative memory result; and
in response to an expiration of a timer, retrieving a plurality of statistics values from the set of statistics entries;
wherein the set of nonpermanent associative memory entries is maintained as a queue.

10. The method of claim 9, wherein the item corresponds to a netflow, the netflow including a source address and a destination address, or the netflow including a source address, a destination address, and a port number.

11. An apparatus comprising:
means for programming an associative memory with a set of permanent associative memory entries within a set of associative memory entries;
means for initializing a set of permanent statistic entries within a set of statistic entries in a memory device;
means for performing a lookup operation in the associative memory on the set of associative memory entries based on an item to generate an associative memory result directly or after a subsequent memory read operation;
means for evaluating the associative memory result;
means for adding an entry to a set of nonpermanent associative memory entries within the set of associative memory entries in response to the associative memory result corresponding to a not found condition;
means for updating a statistics entry in the set of statistics based on the associative memory result in response to the associative memory result corresponding to a found condition;
means for retrieving a plurality of statistics values from the set of statistics entries in response to an expiration of a timer; and
means for maintaining the set of nonpermanent associative memory entries as a queue.

12. The apparatus of claim 11, comprising means for removing an oldest entry from the set of nonpermanent associative memory entries in response to determining the number of entries within the set of nonpermanent associative memory entries exceeds a threshold.

13. A method comprising:
performing a lookup operation in an associative memory on a set of associative memory entries based on an item to generate an associative memory result directly or after a subsequent memory read operation;
evaluating the associative memory result;
in response to the associative memory result corresponding to a not found condition, adding an entry to the set of associative memory entries;
in response to the associative memory result corresponding to a found condition, updating a statistics entry in a set of statistics based on the associative memory result; and
in response to determining a number of entries within the set of associative memory entries exceeds a threshold, identifying a position of an oldest entry in the set of associative memory entries and after said identifying the position, retrieving a first statistics value corresponding to the position from the set of statistics;
wherein the set of associative memory entries is maintained as a ring buffer.

14. The method of claim 13, wherein the item corresponds to a netflow, the netflow including a source address and a destination address, or the netflow including a source address, a destination address, and a port number.

15. The method of claim 13, further comprising adding or initializing an initial statistics value in the set of statistics in response to the associative memory result corresponding to the not found condition.

16. The method of claim 13, wherein the set of statistics is maintained in a second memory.

17. The method of claim 13, wherein the associative memory includes a binary or ternary content-addressable memory.

18. The method of claim 13, wherein said updating the statistics entry includes adding a byte count corresponding to the item to a current value of the statistics entry.

19. An apparatus comprising:
means for performing a lookup operation in an associative memory on a set of associative memory entries based on an item to generate an associative memory result after a subsequent memory read operation;
means for evaluating the associative memory result;
means for adding an entry to the set of associative memory entries in response to the associative memory result corresponding to a not found condition;
means for updating a statistics entry in a set of statistics based on the associative memory result in response to the associative memory result corresponding to a found condition; and
means for maintaining the set of associative memory entries as a ring buffer.

20. The apparatus of claim 19, further comprising means for removing entries from the set of associative memory entries and for forwarding their corresponding statistics values from the set of statistics to a collection mechanism in response to a number of entries within the set of associative memory entries exceeding a threshold.

21. A method comprising:
  programming an associative memory % with a set of permanent associative memory entries within a set of associative memory entries;
  initializing or adding a set of permanent statistic entries within a set of statistic entries in a memory device;
  performing a lookup operation in the associative memory on the set of associative memory entries based on an item to generate an associative memory result directly or after a subsequent memory read operation;
  evaluating the associative memory result;
  in response to the associative memory result corresponding to a not found condition:
    adding an entry to a set of nonpermanent associative memory entries within the set of associative memory entries; and
    initializing or adding a corresponding initial statistics value to a set of nonpermanent statistics within the set of statistic entries;
  in response to the associative memory result corresponding to a found condition, updating a statistics entry in the set of statistics based on the associative memory result; and
  in response to an expiration of a timer, retrieving a plurality of statistics values from the set of statistics entries;
  wherein the set of nonpermanent associative memory entries is maintained as a ring buffer.

22. The method of claim 21, wherein the item corresponds to a netflow, the netflow including a source address and a destination address, or the netflow including a source address, a destination address, and a port number.

23. An apparatus comprising:
  means for programming an associative memory with a set of permanent associative memory entries within a set of associative memory entries;
  means for initializing a set of permanent statistic entries within a set of statistic entries in a memory device;
  means for performing a lookup operation in the associative memory on the set of associative memory entries based on an item to generate an associative memory result directly or after a subsequent memory read operation;
  means for evaluating the associative memory result;
  means for adding an entry to a set of nonpermanent associative memory entries within the set of associative memory entries in response to the associative memory result corresponding to a not found condition;
  means for updating a statistics entry in the set of statistics based on the associative memory result in response to the associative memory result corresponding to a found condition;
  means for retrieving a plurality of statistics values from the set of statistics entries in response to an expiration of a timer; and
  means for maintaining the set of nonpermanent associative memory entries as a ring buffer.

24. The apparatus of claim 23, comprising means for removing an oldest entry from the set of nonpermanent associative memory entries in response to determining the number of entries within the set of nonpermanent associative memory entries exceeds a threshold.

* * * * *

UNITED STATES PATENT AND TRADEMARK OFFICE
CERTIFICATE OF CORRECTION

PATENT NO. : 6,871,265 B1
APPLICATION NO. : 10/079229
DATED : March 22, 2005
INVENTOR(S) : Oren et al.

It is certified that error appears in the above-identified patent and that said Letters Patent is hereby corrected as shown below:

Col. 1, line 45, replace "EP forwarding" with -- IP forwarding --

Col. 6, line 14, replace "etc)" with -- etc.) --

Col. 6, line 19, insert the following paragraph after "mechanism 120.":
-- In one embodiment, control logic 100 programs associative memory entries 400 (FIG. 4) in associative memory 110. In one embodiment, associative memory entries 400 includes a set of permanent (static) entries 410, a set of dynamic (nonpermanent) entries 420, and possibly other entries 430 (e.g., for other functions). In one embodiment, associative memory entries 400 includes only permanent entries 410 and dynamic entries 420. In one embodiment, associative memory entries 400 includes only permanent entries 410. In one embodiment, associative memory entries 400 includes only dynamic entries 420. In one embodiment, permanent entries 410 correspond to items 107 which are routinely generated and relatively static in nature, such as, but not limited to packet counts. In one embodiment, dynamic entries correspond to items 107 which are dynamic in nature, such as, but not limited to source-destination netflows, source-destination-port number netflows, etc. --

Col. 9, line 22, replace "initialing" with -- initializing --

Col. 11, line 8, replace "memory % with" with -- memory with --

Signed and Sealed this

Twenty-eighth Day of August, 2007

JON W. DUDAS
*Director of the United States Patent and Trademark Office*